Patented Feb. 18, 1947

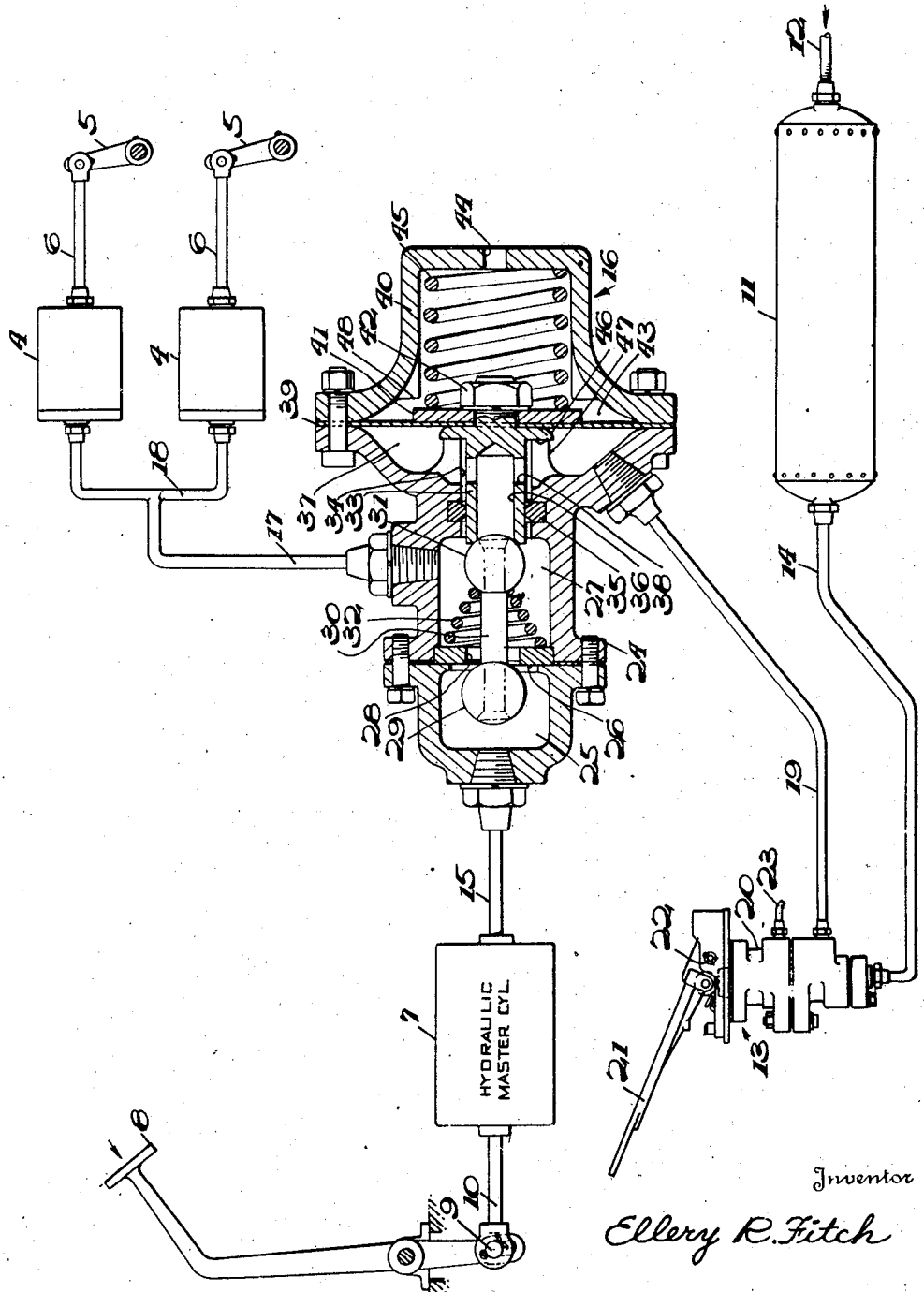

2,416,091

UNITED STATES PATENT OFFICE 2,416,091

FLUID PRESSURE CONTROL MECHANISM

Ellery R. Fitch, Elyria, Ohio, assignor to Bendix-Westinghouse Automotive Air Brake Company, Elyria, Ohio, a corporation of Delaware Application August 23, 1943, Serial No. 499,683

2 Claims. (Cl. 137—144)

1

This invention relates primarily to fluid pressure control mechanism and more particularly to fluid pressure control mechanism for the brakes of an airplane.

It has previously been proposed to provide, in connection with an airplane equipped with hydraulic brakes of more or less conventional type, a separate or auxiliary fluid pressure supply such as compressed air for operating the brakes in the event of failure of the hydraulic system, the flow of fluid pressure from the emergency supply being controlled by means of a brake valve located adjacent the operator. In systems of this type, and particularly in systems wherein different fluid mediums are utilized in different portions of the system, it is necessary to provide means for preventing intermixing of the fluids, and it is accordingly an object of the present invention to provide means for controlling the connections between the fluid pressure sources and the fluid pressure actuator and for preventing such intermixing of the fluids.

A further object of the invention is to provide, in a system of the above type, valvular means of the so-called double check valve type so constituted as to isolate one of the fluid pressure sources from the other.

A still further object of the invention is to provide, in connection with a system of the above type, a double check valve for normally maintaining a connection between the source of hydraulic fluid and the actuator, and for permitting communication to be established between the auxiliary source of fluid pressure and the actuator at the will of the operator.

Yet another object of the invention is to provide, in a double check valve of the above type, means for insuring positive operation of the valve mechanism to connect the auxiliary source with the actuator at the will of the operator regardless of the pressure being supplied to the actuator from the primary source.

These and other objects and novel features of the invention will appear more fully hereinafter from the following detailed description when taken in connection with the accompanying drawing. It is to be expressly understood, however, that the drawing is employed for purposes of illustration only, and is not designed as a definition of the limits of the invention, reference being had for this purpose to the appended claims.

In the drawing, the invention is illustrated in connection with a brake system for an airplane, not shown, wherein a pair of brake actuators or

2 cylinders 4 are connected to brake levers 5 through piston rods 6, and are adapted to be supplied with fluid pressure from a hydraulic master cylinder 7 of conventional type, the piston of the master cylinder being actuated by means of a brake pedal 8 having a pivotal connection 9 with a piston rod 10 of the master cylinder. An auxiliary source of fluid pressure includes a reservoir 11 supplied with fluid pressure by a compressor, not shown, through a conduit 12, the flow of fluid pressure from the reservoir being controlled by means of a control valve 13 connected thereto by means of a conduit 14. The master cylinder is connected with the actuators through a conduit 15, a double check valve 16, to be described hereinafter, a conduit 17 and a conduit 18, while the control valve 13 is connected with the brake actuators through a conduit 19, the valve 16, and conduits 17 and 18.

The control valve 13 may preferably be constructed in accordance with the principles set forth in the patent to William J. Andres and Roy S. Sanford, No. 2,133,275, dated October 18, 1938. This valve is provided with a casing 20 having an operating pedal 21 pivotally mounted thereon by means of a pivot pin 22, and is provided with an exhaust conduit 23, and it will be understood on reference to the above patent, that the valve is of the so-called self-lapping type and that with the control pedal in the position shown, the valve mechanism serves to prevent communication between conduits 14 and 19 and to permit communication between conduits 19 and 23, while on depression of the pedal, the valve serves to prevent communication between conduits 19 and 23 and to permit communication between conduits 14 and 19 to establish a pressure in the latter conduit substantially proportional to the degree of movement of the control pedal. Thus in the embodiment shown, power operation is available under the control of the valve 13 while manual operation of the brakes is available by operation of the brake pedal 8.

As illustrated in the drawing, the double check valve is provided with a casing 24, the left end of the casing being provided with an inlet chamber 25 having a connection with the conduit 15 leading to the hydraulic master cylinder. A partition 26 is provided at the right end of the chamber, and serves to define, in connection with the casing, an outlet chamber 27, the partition being provided with a centrally located port 28 for permitting communication between the chambers. The flow of fluid through the port is controlled by means of a valve 29, the valve being provided with a stem 30 and a second valve 31 carried by the right end of the valve stem, the assembly thus formed being urged to the right by means of a valve spring 32 interposed between the right face of the partition 26 and the left side of the valve 31. The valve assembly is thus adapted for movement in one direction under the action of the spring 32, movement in the other direction being controlled by means of a valve operating element 33 slidably mounted in a bore 34 formed in the casing at the right end of the outlet chamber 27, leakage between the outer surface of the member and the inner surface of the bore being prevented by means of a suitable sealing element 35. The valve operating element is provided with a bore 36, this bore being open at the left end and adapted to be closed by contact with the valve 31. A second inlet chamber 37 is formed in the housing at the right end of the bore 34, and communication between the bore 36 and the chamber 37 is effected by means of ports 38 formed in the wall of the bore. The right end of the chamber is closed by means of flexible diaphragm 39 clamped at its outer periphery between the right end of the casing and a cover plate 40 and attached at its center to the valve operating element 33 by means of a suitable washer 41 and a nut 42. The diaphragm acts in conjunction with the cover 40 to form an atmospheric chamber 43 at the right side of the diaphragm, and the latter chamber is connected to atmosphere by means of a vent 44 in the cover. The valve operating element is normally maintained in the position shown by means of a relatively heavy spring 45 interposed between the cover and the washer 41, the spring 45 being of sufficient tension to overcome the tension of the valve spring 32 and to normally maintain the valve operating element in the position shown, a shoulder 46 formed thereon being maintained in engagement with stops 47.

It will be understood from the foregoing description that with the parts of the valve 16 in the position shown, operation of the brake pedal 8 to compress fluid in the master cylinder will serve to supply fluid under pressure to the actuators through conduit 15, inlet chamber 25, port 26, outlet chamber 27, and conduits 17 and 18, the passage of fluid from the chamber 27 into the inlet chamber 37 and into the conduit 19 being prevented by the action of the valve 31 in closing the left end of the bore 36 in the valve operating element, it being understood that the spring 45 is also so tensioned as to prevent movement of the valve operating element and diaphragm to the right in response to the action of fluid pressure on the area of the valve operating element at the left side of the seal 35. Since the spring 45 is so tensioned as to maintain the parts in the position shown regardless of the degree of fluid pressure supplied to the chamber 27, it will be understood that release of the brakes will be effected on release operation of the brake pedal 8 without changing the relationship of the parts in the valve mechanism 16.

In the event the operator is desirous of supplying fluid pressure to the actuators from the reservoir 11, it will be apparent that on depression of the pedal 21, the valve mechanism 13 will be effective to dis-establish communication between conduits 19 and 23 and to establish communication between conduits 14 and 19, whereupon fluid pressure will be supplied to the conduit 19, and therefore to the inlet chamber 37 to which the conduit is connected, at a pressure which is substantially proportional to the degree of depression of the brake pedal. Since the diaphragm 39 is designed to have a relatively large area, it will be seen that the application of a relatively small pressure to the inlet chamber 37 will be sufficient to overcome the tension of the spring 45 sufficiently to permit movement of the diaphragm and the valve operating element 33 to the right to allow movement of the valve 29 to port closing position under the action of the spring 32. Thus the valve 29 will be moved to closed position during initial movement of the valve operating element to the right, subsequent movement of the element serving to move the left end of the bore 36 away from the valve 31 to permit communication between the inlet chamber 37 and the outlet chamber 27 through ports 38 and bore 36, whereupon fluid pressure will be supplied to the actuators through the chamber 27 and conduits 17 and 18 at the pressure established in the inlet chamber 37. Stops 48 are provided in the cover member 40, these stops being adapted to engage the right side of the washer 41 in order to prevent excessive movement of the diaphragm to the right with a resultant tendency toward distortion and rupture of the diaphragm, and on further operation of the brake valve 13 to increase the pressure of fluid supplied to the actuators, the washer 41 will be maintained against the above stops and continuous communication will be maintained between the inlet chamber 37 and the outlet chamber 27. On operation of the brake valve to release fluid pressure from the actuators, fluid pressure will be released through conduits 17 and 18, outlet chamber 27, the bore 36, ports 38, inlet chamber 37, conduit 19, the valve 13 and the exhaust conduit 23. Since the tension of the spring 45 is relatively light compared with the fluid pressure exerted on the area of the diaphragm 39, the passage between chambers 27 and 37 will remain open until the pressure in chamber 37 is reduced to a comparatively low value, whereupon the valve operating element will be moved to the left under the action of the spring 45, this serving to close the end of the bore 36 and subsequently move the valve 29 to the position shown in the drawing. In order to prevent leakage of pressure fluid from the chamber 27 to the chamber 25 when the actuators are being supplied with fluid from the reservoir 11, the valve spring 32 is sufficiently tensioned to maintain the valve 29 in closed position against any operating pressure obtaining in the outlet chamber 27.

Thus the master cylinder is normally connected with the actuators at all times, while the novel construction of the valve is such that the operator may establish a connection between the reservoir 11 and the actuators at will, regardless of the pressure being supplied to the actuators by the operation of the master cylinder. The system is thus effective to segregate the fluids in the two portions of the system, and is likewise effective to prevent the entrance of air or other gas into the hydraulic portion of the system in the event a partial vacuum is formed in that portion of the system during release operation of the brake pedal 8, as may occur under certain conditions of operation of a system of this type. It is also to be noted that the valve mechanism 16 may be equally effective to normally prevent intermixing of the fluids in the two portions of the system regardless of the type of fluids being used, it being understood that different or similar liquids may be used in both parts of the system if desired, or that different gases may likewise be utilized in different portions of the system.

While the invention has been illustrated and described herein with considerable particularity, it is to be understood that same is not limited to the form shown but may receive a variety of mechanical expressions which will readily appear to those skilled in the art. Reference will, therefore, be had to the appended claims for a definition of the limits of the invention.

What is claimed is:

1. A double check valve comprising a casing having first and second inlet chambers and an outlet chamber, a valve for controlling communication between the first inlet chamber and the outlet chamber, a valve for controlling communication between said second inlet chamber and outlet chamber, means rigidly connecting said valves to each other, a valve operating element having a bore connected with the second inlet chamber at one end and adapted at its other end to engage the second named valve to prevent communication between the second inlet chamber and the outlet chamber on movement of said element in one direction and to disengage the second named valve to permit communication between the second inlet chamber and the outlet chamber on movement of the element in the other direction, a spring for moving the first named valve to closed position on movement of the element in said other direction, a stronger spring interposed between said casing and element for biasing the latter in said one direction to overcome the force exerted by the first named spring to normally maintain the first named valve in open position, means responsive to the pressure in said second inlet chamber for moving the element in the said other direction when the pressure in said chamber exceeds a predetermined value to permit closing of the first named valve, said rigid connection between said valves providing means whereby the valves are positively sequentially operated in response to movement of said element to prevent communication between the outlet chamber and both inlet chambers at the same time and whereby positive disengagement of the second named valve with said other end of the bore in said element is effected on movement of the latter in said other direction when the first named valve is in closed position.

2. A double check valve comprising a casing having first and second inlet chambers and an outlet chamber, a valve for controlling communication between the first inlet chamber and the outlet chamber, a valve for controlling communication between said second inlet chamber and outlet chamber, means rigidly connecting said valves to each other, a valve operating element having a bore connected with the second inlet chamber at one end and adapted at its other end to engage the second named valve to prevent communication between the second inlet chamber and the outlet chamber on movement of said element in one direction and to disengage the second named valve to permit communication between the second inlet chamber and the outlet chamber on movement of the element in the other direction, a spring for moving the first named valve to closed position on movement of the element in said other direction, a stronger spring interposed between said casing and element for biasing the latter in said one direction to overcome the force exerted by the first named spring to normally maintain the first named valve in open position, a flexible diaphragm connected with said element and responsive to the pressure in said second inlet chamber for moving the element in the said other direction when the pressure in said chamber exceeds a predetermined value to permit closing of the first named valve, said rigid connection between said valves providing means whereby the valves are positively sequentially operated in response to movement of said element to prevent communication between the outlet chamber and both inlet chambers at the same time and whereby positive disengagement of the second named valve with said other end of said bore in said element is effected on movement of the latter in said other direction when the first named valve is in closed position.

ELLERY R. FITCH.

REFERENCES CITED

The following references are of record in the file of this patent:

UNITED STATES PATENTS

| Number | Name | Date |
|---|---|---|
| 2,240,166 | Stanley | Apr. 29, 1941 |
| 2,275,255 | Freeman | Mar. 3, 1942 |
| 2,336,887 | Piron | Dec. 14, 1943 |
| 2,313,991 | Fitch | Mar. 16, 1943 |
| 2,132,090 | Vorech | Oct. 4, 1938 |
| 2,380,507 | Eaton | July 31, 1945 |
| 2,200,830 | Beharrell | May 14, 1940 |
| 2,320,763 | Trautman | June 1, 1943 |
| 1,508,938 | Powers | Sept. 16, 1924 |
| 1,707,742 | Schjolm | Apr. 2, 1929 |